United States Patent
Fujimoto et al.

(10) Patent No.: US 9,576,005 B2
(45) Date of Patent: Feb. 21, 2017

(54) SEARCH SYSTEM

(71) Applicant: Hitachi Solutions, Ltd., Tokyo (JP)

(72) Inventors: Minoru Fujimoto, Tokyo (JP); Yoshiki Sameshima, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 15/051,808

(22) Filed: Feb. 24, 2016

(65) Prior Publication Data

US 2016/0299924 A1    Oct. 13, 2016

(30) Foreign Application Priority Data

Apr. 9, 2015  (JP) ................. 2015-080047

(51) Int. Cl.
  *G06F 21/62* (2013.01)
  *G06F 17/30* (2006.01)
  *G06F 12/14* (2006.01)
  *H04L 9/32* (2006.01)

(52) U.S. Cl.
  CPC ..... *G06F 17/30312* (2013.01); *G06F 12/1408* (2013.01); *G06F 17/30011* (2013.01); *G06F 17/30477* (2013.01); *G06F 21/6227* (2013.01); *H04L 9/3247* (2013.01); *G06F 2212/1052* (2013.01)

(58) Field of Classification Search
  CPC .............. G06F 21/6218; G06F 21/6227; G06F 21/6209; G06F 17/30312; G06F 17/30011; G06F 17/30424; G06F 17/30477; G06F 12/1408; G06F 2212/1052; H04L 9/3247
  See application file for complete search history.

(56) References Cited

U.S. PATENT DOCUMENTS

| 9,413,734 | B1* | 8/2016 | Wong .................... H04L 63/061 |
| 2015/0154418 | A1* | 6/2015 | Redberg ............ G06F 17/30106 713/165 |
| 2016/0117521 | A1* | 4/2016 | Spalka ................ G06F 21/6227 713/171 |

FOREIGN PATENT DOCUMENTS

| JP | 2002-278970 A | 9/2002 |
| JP | 2003-150060 A | 5/2003 |
| JP | 2003-150600 A | 5/2003 |

OTHER PUBLICATIONS

Bao et al., Private Query on Encrypted Data in Multi-User Settings, Springer-Verlag, 2008.*

(Continued)

*Primary Examiner* — Minh Dinh
(74) *Attorney, Agent, or Firm* — Mattingly & Malur, PC (57) ABSTRACT

A search system includes a storage device and a search server. The storage device stores an index database storing an index encrypted with an index key and the index key encrypted with a user key and associated with the encrypted index and stores a document database storing a document encrypted with a document key and the document key encrypted with the user key and associated with the encrypted document. The search server extracts a term for search from a requested search query, decrypts the encrypted index key with a user key which belongs to a user requesting the search query, encrypts the extracted term with the decrypted index key without storing the decrypted index key in a non-transitory storage device, searches the index database with the index encrypted using the encrypted first term, and sends a search result to a terminal.

5 Claims, 7 Drawing Sheets

(56) References Cited

OTHER PUBLICATIONS

Chang et al., Privacy Preserving Keyword Searches on Remote Encrypted Data, 2005.*
Song et al., Practical Techniques for Searches on Encrypted Data, IEEE, 2000.*

* cited by examiner

| 701 | 702 |
|---|---|
| GROUP NAME | BELONG USER NAME |
| GROUP X | USER A, USER B, USER C |
| GROUP Y | USER A, USER D |
| | |

GROUP DATABASE

SEARCH SYSTEM

CLAIM OF PRIORITY

The present application claims priority from Japanese patent application JP 2015-80047 filed on Apr. 9, 2015, the content of which is hereby incorporated by reference into this application.

BACKGROUND

The present invention relates to a search system which searches data with the data encrypted.

Storage services are one kind of cloud services. The storage services store document data uploaded by users and enable the users and user groups who are given permission by the users to share the document data. The storage services provide full-text search service which searches document data including keywords.

For the storage services, a problem that third parties might inspect the document data stored in the storage services has been pointed out. In particular, when legal organs, such as investigating authorities and court, request to submit the storage, the service providers cannot probably refuse to submit the storage, and the legal organs probably impound the storage. In the cloud services, a plurality of users share servers, storage, and the like. Thus, storage including one user's document data may be submitted even if the user is not an investigation target, and the third parties, such as the investigating authorities and the court, may access the document without being noticed by the user. Thus, it is required to take measures to prevent confidential information from leaking out.

Cloud service providers typically encrypt the document data and store the encrypted data. However, there are cases when the cloud service providers are requested to submit the document data by the legal organs and must follow an order to decrypt the encrypted data from the legal organs. This concern can be given not only in the case of storing the document data but also in the cases of key-value stores and relational DBs.

For taking measures against the problems, arts encrypting the document data with keys of users or organizations to which the users belong and storing the encrypted document are proposed. In addition, arts searching full-text of the document data with the data encrypted are proposed.

Background arts of the technical field of the present invention include JP 2002-278970 A and JP 2003-150600 A. The following describes JP 2002-278970 A. JP 2002-2789870 A discloses a document managing system comprising a client and a document managing server providing functions of storing an electronic document, searching a bibliography, searching full texts, and referencing. The client encrypts a document, the bibliography corresponding to the document, and full-text index information by a same method or different methods and sends them to the server. The server records the encrypted document and index information. In searching, the client encrypts search criteria by a method which is same as the method corresponding to the index information and sends encrypted search criteria to the server. The server searches index information encrypted with the encrypted search criteria, and sends the encrypted document to the client in referencing. The full-text index information is stored in the server by using inverted index method. The client encrypts the index information Caesar cipher.

JP 2003-150600 A discloses an information search method, by an information search device, comprising a language analyzing step of analyzing a character string, an encrypting step of encrypting, an information storing step of storing a plurality of pieces of information including the character string, a query input step of inputting a query, a character strings comparing step of comparing a first character string with a second character string, a decrypting step of decrypting, and a displaying or storing step of displaying one or a plurality of information names and the information contents including the coincident character string.

SUMMARY

In JP 2002-278970 A and JP 2003-150600 A, the clients used by the user have to create the index information. For creating a term, the language analysis needs to be executed and a dictionary for the language analysis is necessary. Indexes with word stems, such as "write" for "wrote", are typically used for most languages expect for Japanese, such as English. Index keys for encrypting the index information are necessary. Keys including decrypting keys have to be managed.

Language analysis programs, dictionaries, and arts for managing the keys are well-known, and systems for achieving them are proposed. However, client systems using the storage services are typically general-purpose web browsers. It is difficult technically and operationally to incorporate the language analysis programs, the dictionaries, and the key management function into great variety of web browsers.

In addition, JP 2002-278970 A and JP 2003-150600 A do not take account of search services in the cloud services used by multitenant. In other words, JP 2002-278970 A and JP 2003-150600 A do not take account of the case when a plurality of organizations and a plurality of individuals who belongs to no organization use a same search server. Thus, documents which are restricted to read are likely to be included in a search result. If access control for documents is executed and then bodies of the restricted documents are not read, users who do not have an access right for the restricted documents and users who do not belong to any organization which does not have the access right can read the name of the restricted documents and a part of the restricted documents. If processing which excludes the restricted documents from search results are executed, the amount of processing is liable to increases occurs.

The present invention provides, in typical Internet usage environment, functions searching data on storage of cloud service providers with the data encrypted. The present invention provides not only full-text search but also an encrypted search art used in the key-value stores and the relational DBs.

The following is a representative example of the invention disclosed in this description. A search system comprising: a storage device configured to store a document and an index which are encrypted with a searchable format; and a search server configured to search data stored in the storage device, wherein the storage device configured to store: an index database storing an encrypted index, which is an index encrypted with an index key, and an encrypted index key, which is the index key encrypted with a user key, associated with the encrypted index; and a document database storing an encrypted document, which is the document encrypted with a document key, and an encrypted document key, which is the document key encrypted with the user key, associated with the encrypted document, wherein the search server is configured to extract a term for search from a requested search query, decrypt the encrypted index key with a user key which belongs to a user requesting the search query, encrypt the extracted term with the decrypted index key without storing the decrypted index key in a non-transitory storage device, search the index database with the index encrypted using the encrypted term, and send a search result to a terminal.

Representative embodiments of the present invention can search bodies of documents with the bodies encrypted. Problems, constructions, and effects which are not above-mentioned are explained in the following embodiments.

BRIEF DESCRIPTIONS OF DRAWINGS

The present invention can be appreciated by the description which follows in conjunction with the following figures, wherein.

DETAILED DESCRIPTIONS OF EMBODIMENTS

Figure 1:
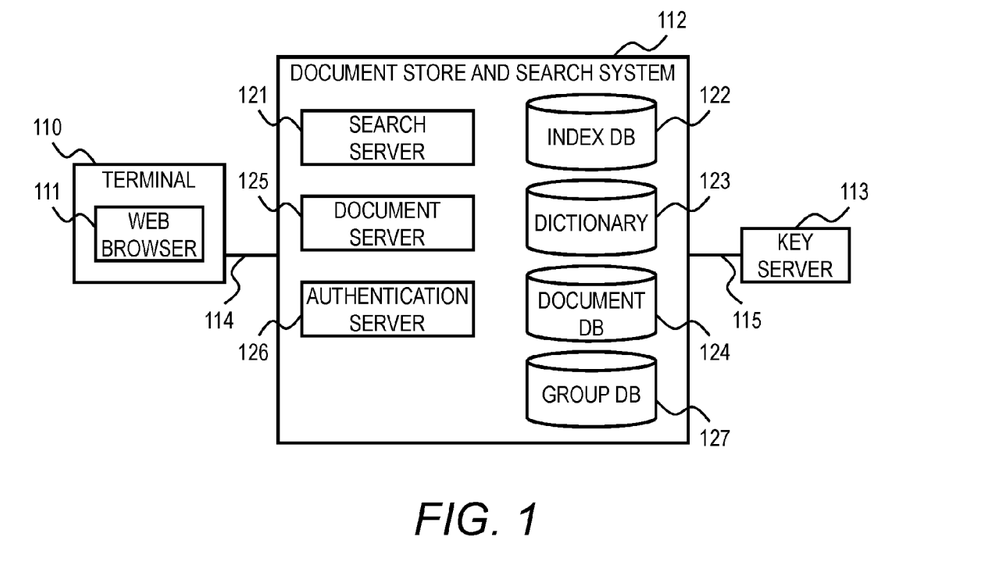
FIG. 1 is a block diagram depicting a configuration of a whole document store and search system according to Embodiment 1.

FIG. 1 is a block diagram depicting the configuration of a whole document store and search system.

The document store and search system 112 includes a search server 121, a document server 125, and an authentication server 126. The document store and search system 112 is a document store and search system which is provided, for example, by a storage service provider.

The document store and search system 112 is connected with a terminal 110, which is used by a user, through a communication line 114.

The document store and search system 112 is connected with a key server 113 through a communication line 115. The key server 113 may be operated by a service provider which does not operate the document store and search system 112 and may be operated by the storage service provider which operates the document store and search system 112. The key server 113 encrypts or decrypts received data, and the key server 113 sends the encrypted or decrypted data. Keys used in encrypting or decrypting are stored in the key server 113 with a format preventing the keys from being taken out. For example, the key server 113, by using a device called Hardware Security Module (HSM), can execute using the keys and disposing of the keys in the device and can store the keys in order to prevent the keys from being taken out. A token is associated with the keys which cannot be taken out and are used in encrypting and decrypting data with user keys or group keys corresponding to the token.

The communication lines 114 and 115 are, for example, Internets and may be networks within a particular organization, such as intranets.

The search server 121 accesses an index database 122, a dictionary 123, and a document database 124, creates an index to enable a full-text search in the document, and executes searching with the index.

The document server 125 is a computer sending a document designated by a user to a web browser 111 in the terminal 110 and belongs to, for example, the storage service provider. When the document server 125 sends the document, the document server 125 can give users an access right indicating whether the users are permitted to access the document.

The authentication server 126 is a computer authenticating users and sending tokens to the web browser 111 and belongs to, for example, the storage service provider. The authentication server 126 may send the tokens and an index key in response to a request by the search server 121. Since the authentication server 126 is important for security, the authentication server 126 may belong to and be operated by a service provider which does not operate the document store and search system 112 and may belong to and be operated by a user company, as with the key server 113.

The index database 122 is a database storing the indexes created by the search server 121 and the index includes terms to be search keywords, document IDs of documents including the terms, positions of the terms in the documents, some sentences which precede or succeed the terms, and additional information of words in order to enable fast full-text search. The index database 122 belongs to the storage service provider and is used by the search server 121. The configuration of the index database 122 is described below with FIG. 3

The dictionary 123 is used in language processing which extracts the terms used in the full-text search in recording a document, is used in taking out the terms from a query in searching, and belongs to the storage service provider.

The document database 124 is a database storing encrypted documents and the access rights for the document server 125. The document database 124 can be accessed by the search server 121. The document database 124 belongs to the storage service provider. The configuration of the document database 124 is described below with FIG. 3.

The document store and search system 112 includes a group database 127. The group database 127 is a database which manages groups to which the users belong and is used by the authentication server 126. The group database 127 manages what groups exist and which user belongs to each group. The configuration of the group database 127 is described below with FIG. 4. In this description, each of the groups is a group to which users belong, and one user may belong to a plurality of groups. Each of the organizations is an organization to which users belong, and one user can belongs to only one organization.

The terminal 110 is a computer including a processor (CPU) executing programs, a memory storing the programs, a non-volatile storage device storing data used in executing the programs, an input/output interface, such as a keyboard, a mouse, and a display device, and a communication interface. The web browser 111 runs in the terminal 110. The user can search the documents with the document store and search system 112 by using an interface provided by the web browser 111. The terminal 110 may execute not the web browser 111 but an application specialized in accessing the document store and search system 112

Figure 2:
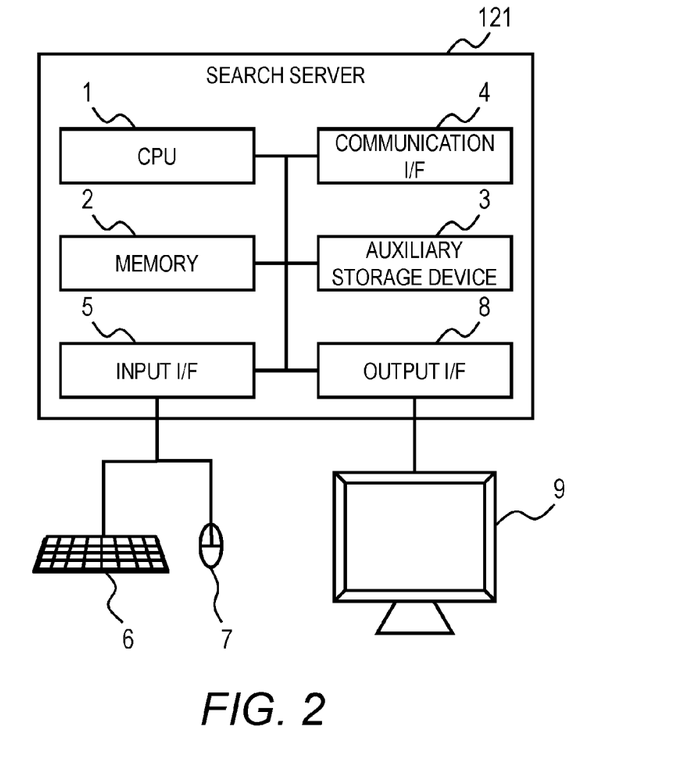
FIG. 2 is a block diagram depicting a physical configuration of each server included in the whole document store and search system according to Embodiment 1.

FIG. 2 is a block diagram depicting the physical configuration of each of the servers included in the document store and search system 112 in Embodiment 1. It should be noted that FIG. 2 depicts the configuration of the search server 121, and the other servers 125 and 126 may have the same configuration. The key server 113 may have the same configuration.

The search server 121 in this embodiment is configured by a computer including a processor (CPU) 1, a memory 2, an auxiliary storage device 3, and a communication interface 4.

The processor 1 executes programs stored in the memory 2. The memory 2 includes a ROM which includes non-volatile memory cells. The memory 2 includes a RAM which includes volatile memory cells. The ROM stores invariable programs, such as BIOS. The RAM includes fast and volatile memory cells, such as DRAM (Dynamic Random Access Memory), and stores temporarily the programs executed by the processor 1 and the data used in executing the programs.

The auxiliary storage device 3 includes a mass and non-volatile memory, such as a magnetic storage device (HDD) and a flash memory (SSD), and stores the programs executed by the processor 1 and data used in executing the programs. The programs are loaded from the auxiliary storage device 3 into the memory 2 and are executed by the processor 1.

The communication interface 4 is a network interface device which controls communications with other devices, such as the terminal 110 and the key server 113, in accordance with predetermined protocols.

The search server 121 may include an input interface 5 and an output interface 8. The input interface 5 is an interface receiving inputs from operators. The output interface 8 is an interface connected with display device 9, printer, and the like and outputting execution results of the programs with a visible format for the operators.

The programs executed by the processor 1 are provided through a removable medium, such as a CD-ROM and a flash memory, or a network and are stored in the non-volatile auxiliary storage device 3 which is a non-transitory memory medium. Therefore, the search server 121 may include an interface reading data from the removable medium.

The search server 121 is a computer system configured by one physical computer or a plurality of logical or physical computers, and may run on the one computer with individual threads or on a virtual computer constructed on a plurality of physical computer resources.

Figure 3:
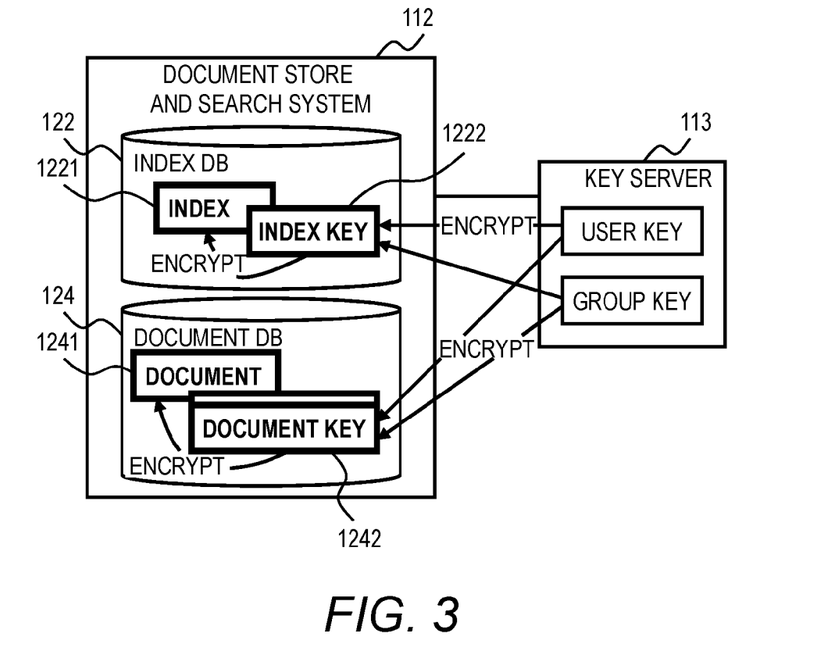
FIG. 3 is an explanatory diagram depicting key management according to Embodiment 1.

FIG. 3 is a diagram depicting key management in Embodiment 1.

The document store and search system 112 in this embodiment encrypts the documents, index information, the keys, and the like with several types of keys. In FIG. 3, the encrypted data is depicted with bold types.

Figure 4:
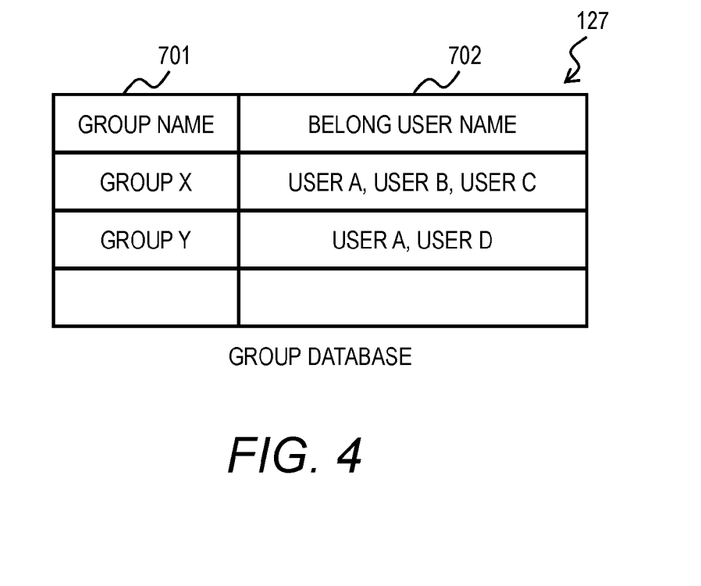
FIG. 4 is a diagram depicting an example of a configuration of a group database according to Embodiment 1.

An index 1221 includes information, such as terms encrypted with an index key 1222. The indexes 1221 are stored in the index database 122 for each user group. The user groups are defined by the group database 127 (FIG. 4).

The index key 1222 is a key used in encrypting information in the index. The index key 1222 is encrypted with a user key or a group key stored in the key server 113. The user key and the group key are managed in order to prevent them from being taken out from the key server 113. Therefore, in the case where the index key is encrypted, the search server 121 sends the index key to the key server 113 and requests to execute encryption. The key server 113 encrypts the index key and sends the encrypted index key 1222 to the search server 121 in reply to the request. In the case where decryption is executed, similar processing is executed. The index key 1222 may be created for each index at random. The encrypted index key 1222 is associated with the index 1221 to be encrypted and is stored in the index database 122.

The document database 124 stores documents 1241 encrypted with a document keys 1242.

The document key 1242 is, a key used in encrypting a document and should be created for each document at random. The encryption and decryption methods with the document key 1242 are same as the methods with the index key. The encrypted document key is associated with the document to be encrypted and is stored in the document database 124. In the case where the encryption with a plurality of user keys and group keys is executed, there exists a plurality of encrypted document 1241. In the case where the document key is encrypted with a plurality of user keys and group keys, there exists a plurality of encrypted document key 1242. A user name and a group name are given to the encrypted document key 1242, and the encrypted document key 1242 is managed in order to identify which user key and group key are used in the encryption.

<Group Management>

FIG. 4 is a diagram depicting an example of the configuration of the group database 127 in Embodiment 1.

The group database 127 includes records (line data) indicating groups, and each of the records includes attributes, such as a group name 701 and a belong user name 702.

The group name 701 includes names of groups. The groups and the records are in one-to-one correspondence. The belong user name 702 is a list including names of users who belong to a corresponding group.

<Document Record Processing>

Figure 5:
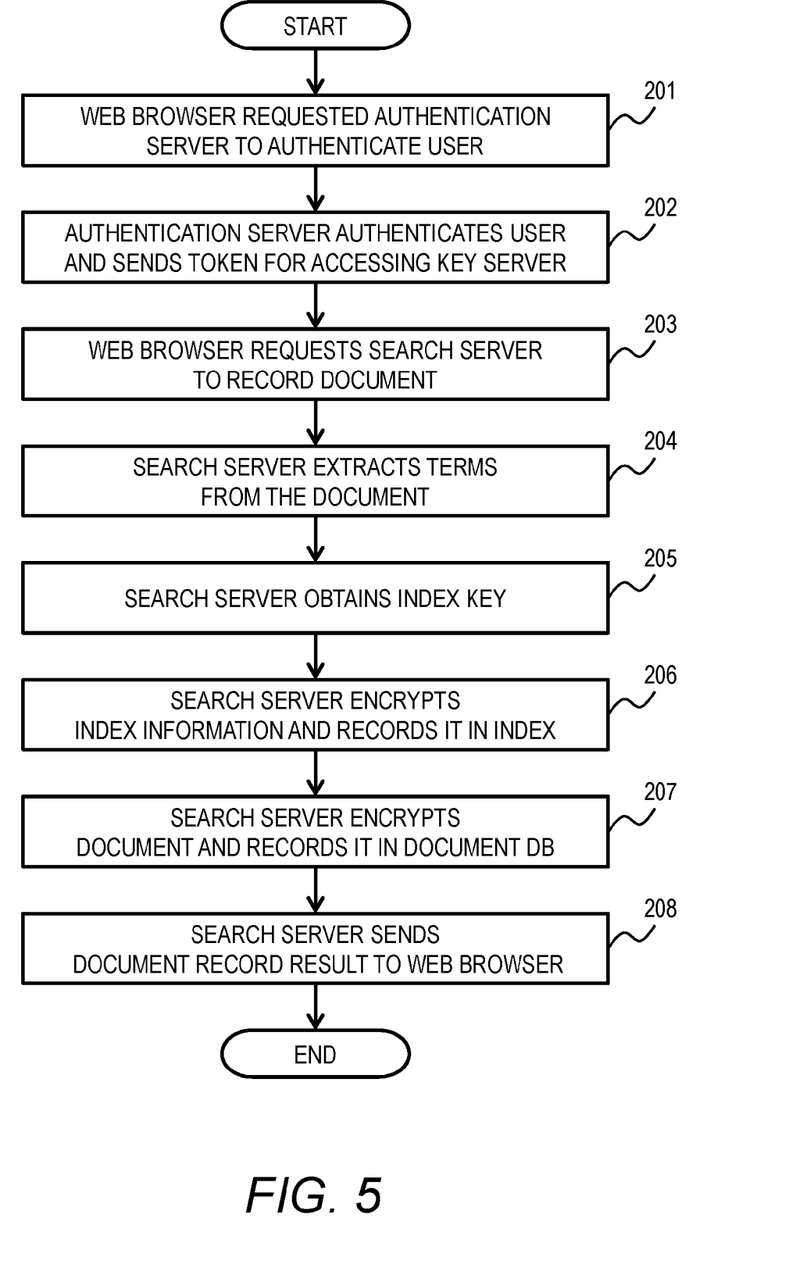
FIG. 5 is a flowchart depicting document record processing according to Embodiment 1.

FIG. 5 is a flowchart depicting the document record processing in Embodiment 1. In the below explanation, the documents is recorded to enable persons who belong to an organization to which a user of the document belongs to access the documents.

First, a user requests to authenticate the user to the authentication server 126 with the web browser 111 by operating the terminal 110 (step 201). This embodiment can use the variety of authentication methods, such as a method with a password, a method with biological information, and a method with hardware.

The authentication server 126 tries to authenticate the user. If the authentication is failed, the authentication server 126 sends an error message in reply to the user's request. On the other hand, if the authentication server 126 succeeds in the authentication, the authentication server 126 sends the user name to the key server 113, and the search server 121 sends a token used in the case of using the user key stored in the key server 113 in reply to the user's request. Further, the authentication server 126 identifies the group to which the user belongs with the group database 127, sends the group name to the key server 113, and sends a token used in the case of using the group key stored in the key server 113 in reply to the user's request (step 202). Publicly known types of tokens and data structures of tokens may be used, and the details are omitted in this description. By the search server 121 showing the token to the key server 113, the key server 113 encrypts or decrypts data with the user key or the group key corresponding to the token.

The web browser 111 receives the tokens from the authentication server 126 and then sends a document designated by the user and the tokens to the search server 121 and requests the search server 121 to record the document (step 203).

The search server 121 receives the document and the token from the web browser 111 and then starts the document record processing (step 204). Specifically, the search server 121 extracts texts from the document, executes a language analysis referring the dictionary 123, and obtains terms and positions of the terms. Since documents typically include a plurality of words to be terms, the search server 121 obtains a plurality of pairs of terms and position of the term. Further, the search server 121 may additionally obtain sentences and words which precede or succeed the terms. In addition, the search server 121 may obtain information for determining search result rank, such as frequencies of the terms. The search server 121 may not only extract the words as the terms but also determine the terms with N-gram method which achieves partial match search.

Thereafter, the search server 121 obtains the index key 1222 to be used in encrypting the terms (step 205). A default index key is an index key of an organization to which the user belongs. Specifically, the search server 121 accesses the index database 122, obtains the encrypted index key 1222 associated with the index of the organization to which the user belongs, and sends the encrypted index key 1222 to the key server 113. As shown in the FIG. 3, the user name and the group name are given to the index key, therefore, the index key corresponding to the organization, which is a group, can be identified. When the encrypted index key 1222 is sent, the search server 121 sends the token for using the group key of the group, which is the organization to which the user belongs, with the encrypted index key 1222. The key server 113 decrypts the index key and sends the decrypted index key to the search server 121. Thus, the search server 121 obtains the index key.

Thereafter, the search server 121 encrypts the terms with the index key, associates the encrypted index 1221 with the index key 1222 used in encrypting the index, and records them in the index database 122 (step 206). Specifically, the encryption processing is executed with common key cryptosystem and a method which enables searching with the index encrypted. And then, the encrypted terms (the index) are associated with the index key 1222 and are recorded in the index database 122. According to the types of indexes, an appropriate recording method, such as a B-tree and a hash index, is adopted.

The index includes items, such as a document ID corresponding to a term, a position of the term in the document, some sentences and words which precede or succeed the term, and a frequency of the term. The preceding or succeeding sentences and words are encrypted, and the encrypted sentences and words are recorded in the index database 122. The other items may be encrypted and are recorded in the index database 122.

Thereafter, the search server 121 encrypts the document with the document key 1242 and records the encrypted document 1241 in the document database 124 (step 207). It is preferable that a key which is created at random is used as the document key 1242 for encrypting the document. Specifically, the search server 121 sends the document key 1242 to the key server 113 and requests to encrypt the document key for encrypting the document. At this time, the search server 121 sends the token for using the group key of the group to which the user belongs with the document key 1242. The key server 113 encrypts the document key and sends the encrypted document key to the search server 121 in reply to the search server's request. The search server 121 associates the encrypted document 1241 with the document key 1242 used in encrypting the document and records them in the document database 124. Further, the search server 121 permits the organization to which the user belongs to access the document.

Thereafter, the search server 121 sends the terminal 110 (the web browser 111) a document record result indicating that the document has been recorded (step 208). The web browser 111 outputs the document record result to the display.

<A Method for Obtaining the Index Keys>

In the above mentioned examples, the group which is permitted to access the document is the organization to which the user belongs. However, in the case where an access from other group is permitted, the index key 1222 associated with an index 1221 corresponding to the other group and stored in the index database 122 in the step 205 is used. A token corresponding to the other group is used as the token which is sent to the key server 113. Further, the search server 121 obtains the token corresponding to the other group in the step 203. An index corresponding to the other group is recorded.

In the case where the index key corresponding to the other group is not recorded in the index database 122, a new index key is created at random. In this case, the search server 121 send the created index key to the key server 113 with the token corresponding to the other group, and obtains the encrypted index key. The search server 121 associates the encrypted index 1221 with the index key 1222 used in encrypting the index and records them in the index database 122.

In the case where not a group but only a user is permitted to access, not the group key but the index key and the document key of the user are used.

<Search Processing>

Figure 6:
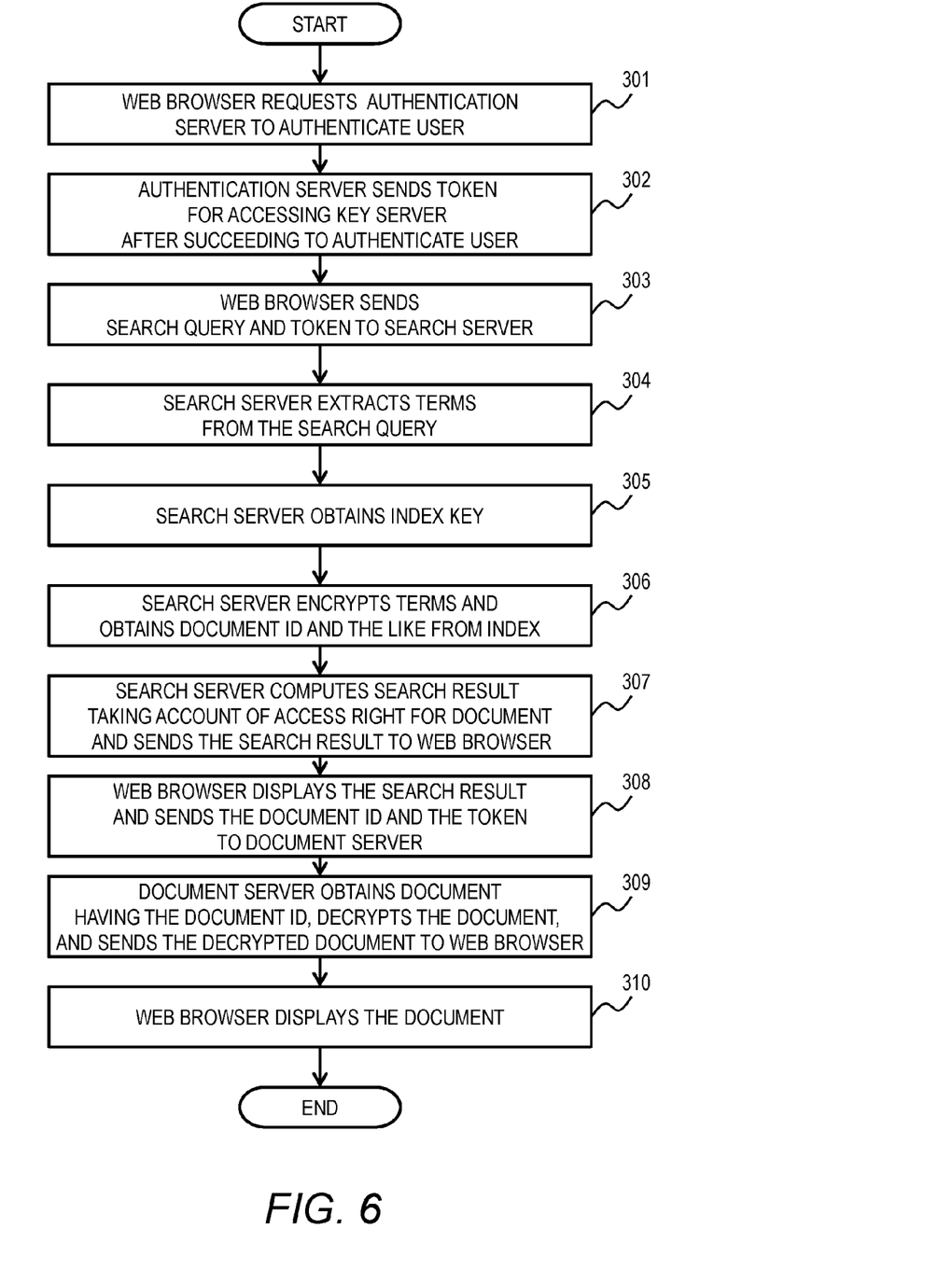
FIG. 6 is a flowchart depicting an overview of search processing according to Embodiment 1.

FIG. 6 is a flowchart depicting an overview of search processing in Embodiment 1.

First, the web browser 111 requests the authentication server to authenticate a user (step 301). This processing is same as the step 201.

Next, the authentication server 126 attempts to authenticate the user. In the case of succeeding in the authentication, the authentication server 126 sends the web browser 111 a token for accessing the key server 113 (step 302). This processing is same as the step 202.

In the case of receiving the token from the authentication server 126, the web browser 111 sends a search query designated by the user and the token to the search server 121 and requests the search server 121 to search (step 303).

In the case of receiving the search query and the token from the web browser 111, the search server 121 starts the search processing (step 304). Specifically, the search server 121 extracts search criteria from the search query, executes the language analysis referring to the dictionary 123, and obtains terms included in the search criteria.

Thereafter, the search server 121 obtains index key to be used in encrypting the terms (step 305). This processing is same as step the 205. Specifically, the search server 121 accesses the index database 122, obtains the encrypted index keys 1222 associated with the indexes of groups to which the user belongs, and sends the encrypted index keys 1222 with tokens corresponding to the encrypted index keys 1222 to the key server 113. The key server 113 decrypts the index keys 1222 and sends the decrypted index, keys to the search server 121. In this way, the search server 121 obtains the index keys. In the case where the user belongs to a plurality of groups, the search server 121 obtains a plurality of index keys. In the case where there is an index associated with the user, the search server 121 additionally obtains a user index key with the same way.

The search server 121 encrypts the terms with each of the group index keys obtained in the step 305 and searches the index database 122 for indexes corresponding to the groups. According to the types of indexes, an appropriate search method, such as the B-tree and the hash index, is adopted. In comparing the terms, a method for searching for terms with the terms encrypted enables the search server 121 to search fast without decrypting the terms each time. The search server 121 obtains document IDs corresponding to hit terms in the search, positions of the terms in the documents, some sentences which precede or succeed the terms, and the like (step 306). In the case of encrypting and recording in the index database 122 in the step 206, the search server 121 decrypts the information with methods corresponding to the encryption methods. There are cases when the processing of the step 306 is repeated a plurality of times because the search query can include operators, such as "AND" and "OR", and a plurality of terms. Further, the processing of step 306 is repeated for each of the groups to which the user belongs.

Thereafter, the search server 121 computes search result taking account of hits with a plurality of index keys and operators, such as "AND" and "OR", included in the search query, and sends the search result to the web browser 111 (step 307). The compute processing is explained below with FIG. 7.

Thereafter, the web browser 111 displays the search result received from the search server 121 and sends document IDs of the documents designated by the user and the token to the document server 125 (step 308).

The document server 125 obtains documents corresponding to the document IDs obtained in the step 306 from the document database 124, decrypts the documents, and sends the decrypted documents to the web browser 111 (step 309). The decryption of the documents is executed in the following way. First, the document server 125 searches the document keys 1242 associated with the documents for a document key decrypted with the user key or the group key of the group to which the user belongs. Next, the document server 125 sends the searched and encrypted document keys and the user's or group's token to the key server 113. Next, the key server 113 decrypts the document keys and decrypts the documents with the decrypted document keys.

Thereafter, the web browser 111 displays the documents received from the document server 125 (step 310).

<Compute Processing>

Figure 7:
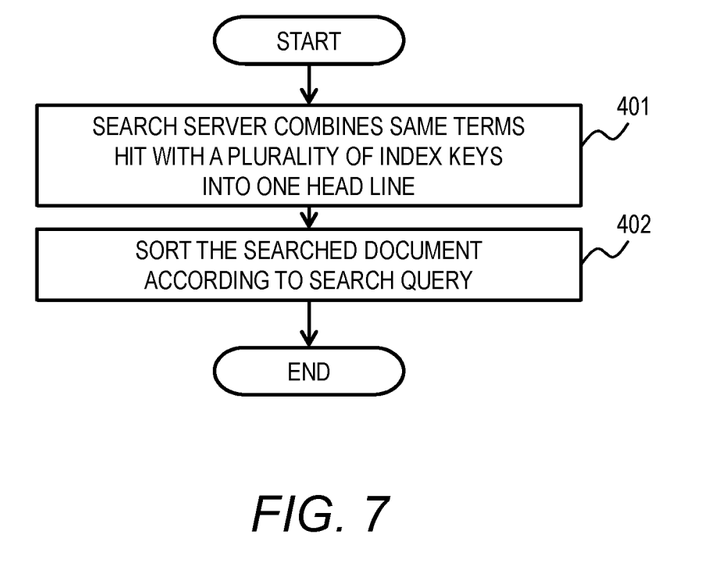
FIG. 7 is a flowchart depicting count processing which computes the search results in Step 307 according to Embodiment 1.

FIG. 7 is a flowchart depicting the compute processing which computes the search result in the step 307 in Embodiment 1.

First, the search server 121 combines the same terms hit with a plurality of index keys into one term (step 401).

Next, the search server 121 narrows the search result according to other search criteria and operators, such as "AND" and "OR", included in the search query (step 402). Further, the search server 121 sorts the search result with the frequencies and the like. Details of the processing of the step 402 are omitted because the processing is similar to a typical full-text search. The compute processing may include processing which checks access rights stored in the document database 124 and excludes documents which the user is not permitted to access.

Embodiment 2

In Embodiment 2 of the present invention, the processing which an owner of a document gives an access right to other person will be explained.

Figure 8:
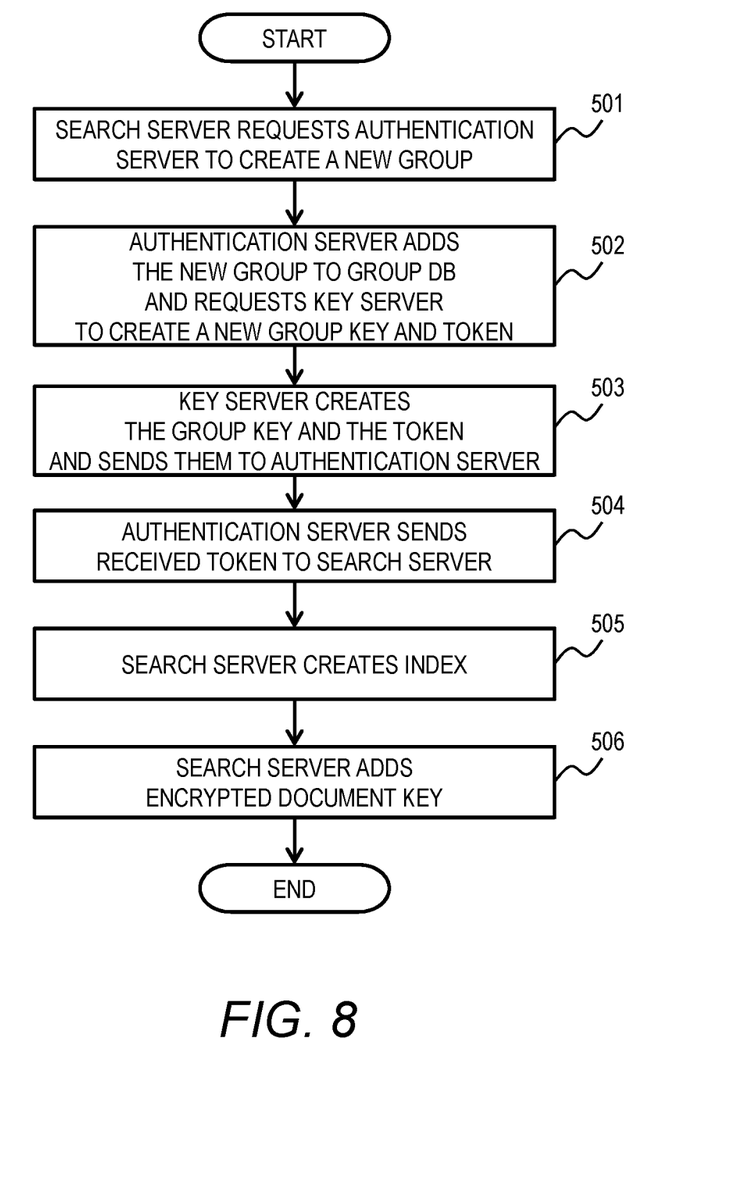
FIG. 8 is a flowchart depicting access right add processing according to Embodiment 2; and The FIG. 9 is a flowchart depicting access right add processing according to Embodiment 3.

FIG. 8 is a flowchart depicting access right add processing in Embodiment 2. In an example explained with FIG. 8, an access right for user E is added to a document granted an access right for user D and group X to which users belongs.

First, the search server 121 requests the authentication server 126 to create a new group including users which are permitted to access the document and a user to be added newly (step 501). In other words, the search server 121 requests to create the new group including, user D, user E, and the users which belong to group X.

The authentication server 126 records names of the group and the users in the group database 127 and adds a new record to the group database 127. The authentication server 126 requests the key server 113 to create a new group key of the group and a token for using the new group key.

The key server 113 creates the requested group key and the requested token for using the group key and sends the created group key and the created token to the authentication server 126 in reply to the request.

After receiving the token, the authentication server 126 sends the received token to the search server 121 (step 504).

After receiving the token, the search server 121 creates an index 1221 corresponding to the new group (step 505). Specifically, the search server 121 decrypts the document 1241 to which the access right is to be added and extracts index information from the decrypted document. The processing which decrypts the document is same as the decryption processing in the step 309. The processing which extracts the index information is same as the extract processing in the step 204. Thereafter, the search server 121 creates a new index key at random, encrypts the index information in the same way as the step 206, and records the index information in the index database 122. The search server 121 sends the token received from the authentication server 126 to the key server 113, requests the key server 113 to encrypt the index key used in encrypting the index information, associates the encrypted index key 1222 with the encrypted index 1221, and records them in the index database 122. At this time, the search server 121 associates the new group name with the encrypted index key and records them in the index database 122. In this manner, it can be identified which user or group the index key belongs to, as shown in FIG. 3.

Thereafter, the search server 121 requests the key server 113 to encrypt the document key used in the step 505, associates the encrypted document key 1242 with the encrypted document 1241, and records them in the document database 124 (step 506).

Embodiment 3

In Embodiment 3 of the present invention, an example of the search server 121 with a function which a document owner adds access rights will be explained.

Figure 9:
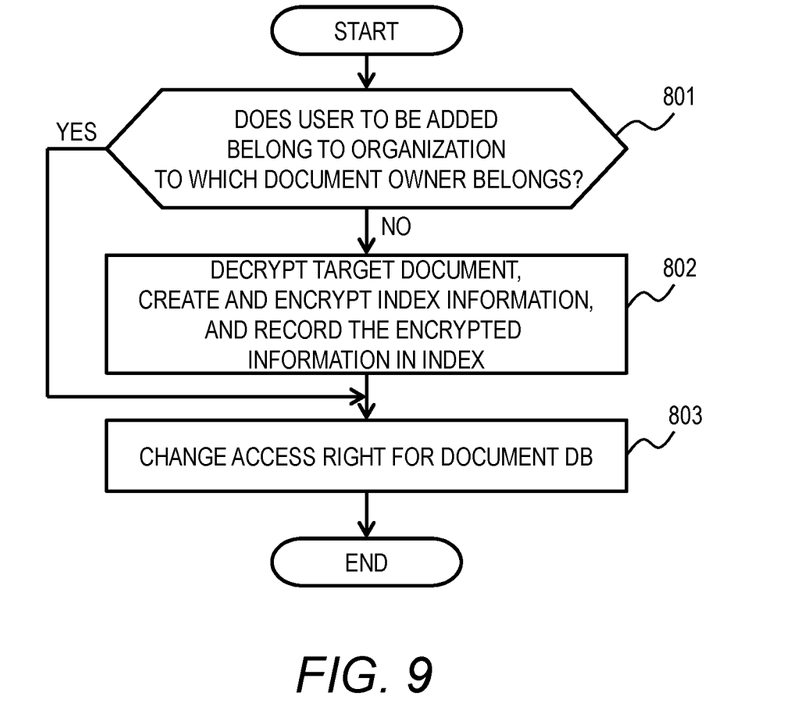

The FIG. 9 is a flowchart depicting access right add processing in Embodiment 3.

In the above-mentioned embodiments, the index keys 1222 and the indexes 1221 are associated with each other, and the associations and the groups are in one-to-one correspondence. In Embodiment 3, an example is explained. The example is that, in the case where a user belongs to an organization, an index and an index key which belongs to the organization are used. The example is that, in the case where a user is an individual who belongs to no organization, an index and an index key which belongs to the user are used.

The search server 121 determines whether a user to be permitted to access belongs to an organization to which a user owning the document belongs (step 801). In the case where the user to be permitted to access belongs to the organization, the search server 121 proceeds to a step 803. On the other hand, in the case where the user to be permitted to access does not belong to the organization, the search server 121 proceeds to a step 802.

In the step 802, the search server 121 decrypts the document to which the access right is added, extracts the index information with the same way of the step 204, adds the index information to an index of an organization to which the user to be permitted to access belongs. In the case where the user belongs to no organization, the search server 121 adds the index information to an index of the user to be permitted to access. Instead of the user to be permitted to access, the search server 121 requests the authentication server 126 to send a token to be used in accessing the key server 113 in order to obtain an index key to be used in encrypting the index which is added to the index database 122.

In a step 803, the search server 121 updates the document database 124 as the user's access right is added to the document.

In Embodiment 3, the processing which, in the step 402 in the count processing (FIG. 4), checks access rights stored in the document database 124 and excludes documents which the user is not permitted to access is indispensable. That is because, in the case where a user which belongs to the organization to which the added user belongs executes searching, the search result includes the search target documents, but the access rights for the document are given to only the added user. Thus, it is necessary that access rights for the documents are checked and documents which the user who executes searching is permitted to access should be excluded from the search result.

Embodiment 4

In the above embodiments, the index keys 1222 and the document keys 1242 are encrypted with the user keys or the group keys managed by the key server 113 and are stored in the index database 122 or the document database 124. There is another way that the tokens include the user keys and the group keys. When the way is adopted, the authentication server 126 may include the keys. In this case, the keys are encrypted in any way and stored in the storage device. The authentication server 126 may obtain the keys from the key server 113.

In the case where an organization to which a user belongs operates the key server 113 and the authentication server 126, the keys may be stored in the storage device without being encrypted because the storage is not submitted to administrative organs, court, and the like before the user realize it.

The index keys and the document keys may be encrypted with not the user keys and group keys but server keys.

Embodiment 5

In Embodiment 1, the indexes 1221 are created for each group. All users of all groups may share the indexes 1221 stored in the index database 122. In this case, each encrypted index 1221 is associated with an index key 1222, and a plurality of encrypted indexes 1221 are created for each of a plurality of index keys 1222. In searching, when terms obtained from a search query are encrypted with an index key, only terms in the index 1221 encrypted with the index key are hit, but terms in the index encrypted with the other index keys are not hit. It is preferable that the index keys 1222 are prepared for each organization and are encrypted with organization keys managed in the key server 113. The index keys 1222 may be prepared for each user and may be encrypted with each user key.

Embodiment 6

In the above embodiments search full-text of the documents, but the present invention can be applied to other search methods. For example, the present invention can be applied to a key-value store. Values for each key are recorded in the key-value store and are obtained by searching with designated keys. The key-value store enables fast search even if the key-value store stores a large amount of data. The B-tree and the hash tree are typically used as indexes for the key-value store.

Searching of the key-value store differs from full-text search of the documents in that the keys and values are recorded instead of terms and documents, respectively. The searching in the key-value store does not required to extract terms from the documents, that is, the term extract step (step 204) and the encrypt step (step 206) are not required in the document record processing (FIG. 5). In the search processing (FIG. 6), the step extracting the terms from the search query (step 304) and the step counting the search result (step 307) are not required.

Embodiment 7

This embodiment includes a relational DB (RDB) to which the present invention is applied. When searching the RDB with a designated search key is executed, data which matches the search key is extracted from the RDB, but the search key may not be compared to data in the RDB in order.

In the case where records are recorded, attribute values to be searched are recorded as terms, and record IDs are recorded as document IDs. In the case where the search server 121 searches for the records, the search server 121 obtains attributes and values of the attributes to be searched from a search query, searches the index database 122, extracts hit record IDs, narrows a search result according to operators, such as "AND" and "OR", included in the search query, and sends the search result to the user.

As described above, the present invention is related to the storage services, which are one kind of could services, is particularly related to the full-text search functions of the storage services, and includes a full-text search function of documents encrypted with service provider keys and user keys. The present invention can be applied to the key-value store and the relational database not limited to the full-text search of documents.

As described above, the embodiments of the present invention can search bodies of documents with the bodies encrypted. In other words, the embodiments can execute keyword search of the documents with the documents and indexes of the documents encrypted using an index of encrypted keyword. The index keys for encrypting and decrypting the indexes and the document keys for encrypting and decrypting the documents are stored only in the memory in the search server 121 and are not stored in the non-transitory memory medium, such as a magnetic disk drive and an SSD, which are non-volatile storage devices. Thus, if the non-transitory memory medium is provided for third parties, the contents of the documents cannot leak out.

Users' client terminals are not required to execute the language analysis processing, prepare the dictionary, and manage keys, and can execute the full-text search to which encrypted search technology applied using typical browsers.

Moreover, when an owner of a document permits other person to search the document, the other person can search the document. For the key-value store and the relational DB not limited to documents, the search processing can be executed with data and indexes encrypted.

This invention is not limited to the above-described embodiments but includes various modifications and similar configurations in the scope of the purpose of the appended claims. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each, embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A search system comprising:
a storage device configured to store a document and an index which are encrypted with a searchable format; and
a search server configured to search data stored in the storage device,
wherein the storage device configured to store:
an index database storing an encrypted index, which is an index encrypted with an index key, and an encrypted index key, which is the index key encrypted with a user key, associated with the encrypted index; and
a document database storing an encrypted document, which is the document encrypted with a document key, and an encrypted document key, which is the document key encrypted with the user key, associated with the encrypted document,
wherein the search server is configured to extract a term for search from a requested search query,
decrypt the encrypted index key with a user key which belongs to a user requesting the search query,
encrypt the extracted term with the decrypted index key without storing the decrypted index key in a non-transitory storage device,
search the index database with the index encrypted using the encrypted term, and
send a search result to a terminal.

2. The search system according to claim 1,
wherein the search server is configured to extract a term from the document, which is requested to be recorded,
encrypt the term extracted from the document with the index key,
encrypt the index key with a user key which belongs to a user requesting to record the document to be recorded,
record the encrypted term extracted from the document and the encrypted index key in the index database,
encrypt the document to be recorded with the document key,
encrypt the document key with the user key which belongs to the user requesting to record the document, and
record the encrypted document and the encrypted document key in the document database.

3. The search system according to claim 1, wherein the user key is peculiar to the user or a group to which the user belongs.

4. The search system according to claim 1, further comprising a key server which manages the index key,
wherein the search server is configured to obtain the index key from the key server with a token of the user.

5. The search system according to claim 1, further comprising a key server which manages the index key,
wherein the search server is configured to request, with a token of the user, the key server to encrypt the index key with the user key.

* * * * *